Figure 1:
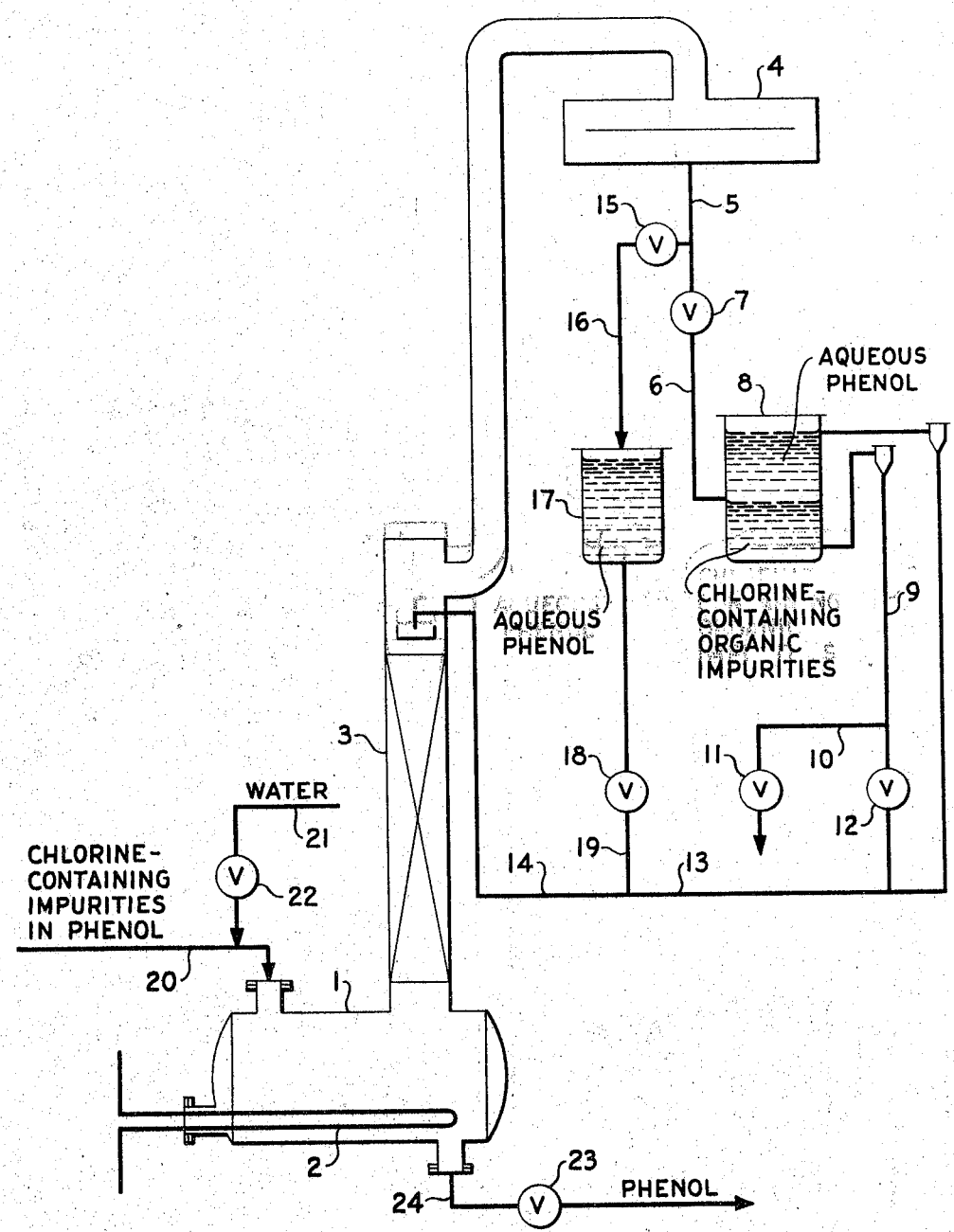

United States Patent Office 3,298,933
Patented Jan. 17, 1967

3,298,933
PRODUCTION OF ULTRA-PURE PHENOL BY REMOVAL FROM A PHENOL OF HIGH PURITY OF SMALL AMOUNTS OF CHLORINE-CONTAINING ORGANIC IMPURITIES
Walter H. Prahl, Buffalo, and Sol J. Lederman, Kenmore, N.Y., assignors to Hooker Chemical Corporation, Niagara Falls, N.Y., a corporation of New York
Filed May 31, 1966, Ser. No. 554,203
10 Claims. (Cl. 203—39)

This is a continuation-in-part of our copending application Serial Number 155,694, filed November 29, 1961, and now abandoned.

This invention relates to the production of phenol of a purity higher than now commercially available from the hydrolysis of chlorobenzene, and particularly to the purification of phenol made in the regenerative process, sometimes known as the Raschig Phenol Process, by removal of chlorine-containing impurities boiling close to phenol therefrom.

Phenol made by the regenerative or Raschig Process is recovered from the reaction mixture resulting from the hydrolysis of chlorobenzene, in the form of a mixture with several chlorine-containing substances, ranging from low boilers, such as monochlorobenzene through substances having boiling points similar to phenol, such as the dichlorobenzenes, to chlorine-containing substances of high boiling points, such as chlorinated diphenyls. Conventionally, this crude phenol is purified by subjecting it to a fractional distillation which removes in a known manner nearly all of these chlorine-containing substances and results in a phenol of over 99.9 percent purity, and a solidification point of over 40.80 degrees centigrade.

In spite of this high purity, however, the conventional method of fractionation leaves small quantities of chlorine-containing substances in the product. Among the traces of impurities which may be found (with their boiling points) are: ortho-dichlorobenzene (180.5 degrees centigrade), meta-dichlorobenzene (173.1 degrees centigrade), para-dichlorobenzene (174.2 degrees centigrade), 1,2,4-trichlorobenzene (two hundred and thirteen degrees centigrade), 1,2,3-trichlorobenzene (two hundred and nineteen degrees centigrade), 1,3,5-trichlorobenzene (208.5 degrees centigrade), ortho-chlorophenol (174.9 degrees centigrade), para-chlorophenol (two hundred and seventeen degrees centigrade), etc. These impurities may interfere with certain commercial uses of such phenol; for instance, in its hydrogenation to cyclohexanol, in its use as an intermediate for pharmaceutical products, etc. There exists therefore, the need for a method of purifying this phenol beyond the degree of purity obtainable by the conventional fractional distillation methods.

An object of the present invention then is to provide a method for the purification of phenol beyond the degree of purity commercially available.

Another object is to provide a process for the separation of the traces of impurities present in commercially available phenol by economical means.

Other objects will become apparent during the course of this description.

These and other related objects are achieved according to the present invention by admixing the phenol with water, vaporizing the said impurities and a part of the phenol, contacting the vapors thus generated with a mixture of phenol and water in liquid phase moving countercurrently to the vapors, and recovering the phenol from both phases. The dried phenol recovered from the liquid phase has been found to be of ultra high purity, making it suitable for any known use.

After the impurities have been separated from the bulk of the phenol by this process, the products of this treatment are present in three separate parts. One part comprises the purified phenol containing some water, the second part is an organic phase distillate comprising the impurities containing some phenol and water, and the third part is an aqueous phase distillate comprising water, with some phenol and impurities. In order to recover the phenol free of water, the impurities essentially free of phenol, and the water suitable for reuse, several modifications of the process may be employed without departing from the scope of this invention.

In the preferred modification, the mixed vapors of the impurities with some phenol and water in a mass transfer zone (hereafter referred to as a transfer zone), are withdrawn and condensed. The condensate is cooled to a temperature below about sixty-six degrees centigrade, at which phenol separates from water, and is mechanically separated into an aqueous phase which is returned to the transfer zone, and an organic phase containing the impurities with some phenol at least a portion of which is withdrawn for further use or processing. The bulk of the wet phenol obtained at the bottom of the transfer zone is, in the preferred form, freed of water by distillation.

Various devices, such as pipes, vessels, etc., can be used as transfer zones. Our preferred device is a column equipped with packings or plates. In the description below, the transfer zone will be designated as a column. We do not wish, however, to be limited by such choice of equipment, except as defined in the claims.

The mixture of phenol and water to be subjected to partial vaporization may have a water content anywhere between the limits of the phenol-water azeotrope, containing approximately ten percent phenol on one hand, and a trace of water sufficient to lower perceptibly the boiling point of the phenol on the other hand. For practical reasons, we prefer to use a mixture containing approximately ten percent water and boiling at approximately one hundred and ten degrees centigrade, at atmospheric pressure. Under these conditions, little phenol is driven over in removing the water, yet sufficient water is present to remove effectively the impurities.

The quantity of water to be contacted in liquid form in the transfer zone with the phenol-water vapors depends on a number of factors, including the percentage of impurities in the phenol, their nature, the efficiency of the transfer zone, and the degree of purity desired in the product, and these may vary over wide limits without deviating from the scope of this invention. For instance, in order to reduce the chlorine content from two hundred parts per million to less than ten parts per million in an efficient transfer zone, we use between 0.02 and two parts of water per part of phenol to be purified. However, variations between 0.005 and five parts of water per part of phenol have been found effective under some circumstances. The feed phenol to be purified of chlorine-containing impurities boiling close to phenol and derived from the vapor phase hydrolysis of monochlorobenzene process, may have a starting freezing point purity of as low as 40.25 degrees centigrade, as compared to the freezing point of pure phenol of 40.93 degrees centigrade. This is equivalent to a mole percent of about 99 percent pure phenol and about one mole percent impurities. In terms of weight percent, the one mole percent impurities would be approximately 1.5 percent by weight. Under normal conditions the phenol will not have this low a starting purity but rather will be in the range of about 40.5 to 40.7 degrees centigrade, which is equivalent to about 0.55 to about 0.3 mole percent impurities, respectively.

The purities of the ultra-pure phenol produced by this invention are generally above 40.8 degrees centigrade and as such are better defined in terms of parts per million of chlorine content. We prefer to produce an ultra-pure phenol product having a chlorine content of less than about 75 parts per million and more preferably less than about 10 parts per million.

Thus, by the process of this invention an upgraded phenol product from the hydrolysis of chlorobenzene having a purity of less than ten parts per million chlorine can be produced. And where a phenol can be used having higher chlorine contents, the ratio of water vapor to phenol in our process can be reduced to effect an operational savings and produce a phenol product having a correspondingly higher chlorine content.

Either superatmospheric pressure or reduced pressure can be used without departing from the scope of this invention. For instance, it has been found that in operating at reduced pressures the separation of polychlorobenzenes from the phenol is more efficient. In general, however, we prefer to operate at atmospheric pressure.

The process can be carried out either as a batch operation and we have developed a process whereby it can also be carried out as a continuous operation.

In the examples below, reference is made to the figures in order to better understand the novel process of this invention. The examples are given for illustrative purposes only, and we do not wish to be limited to them. All parts are by weight and temperatures in degrees centigrade unless indicated otherwise.

*Example 1—Batch process*

One thousand parts by weight of a phenol having a freezing point of 40.83 degrees centigrade and containing about 0.13 mole percent (about 0.2 percent by weight) ortho-dichlorobenzene are filled into still 1 of FIGURE 1, through line 20. One hundred and fifty parts of water are added through line 21 and valve 22, and the mixture is brought to boiling by means of heating coils 2. Vapors pass up through a transfer zone represented by the fractionating column 3 into condenser 4. The condensate has an aqueous phenol phase and an organic phase comprising chlorine-containing organic impurities, such as ortho-dichlorobenzene, in phenol. These phases are withdrawn from the condenser 4 through lines 5 and 6 and valve 7, and separated in gravity separator 8, with the organic phase forming the lower layer. Part of the organic distillate phase is taken off through lines 9 and 10 and valve 11. That portion of the total condensate which is not taken off at 11 is returned through valve 12 and lines 13 and 14, to the top of column 3 as reflux. It is to be understood, however, that the entire condensate can be removed through valve 11, by closing valve 12, without departing from the scope of this invention.

The initial distillate comprises a mixture of ortho-dichlorobenzene, phenol and water, rich in ortho-dichlorobenzene. As the distillation progresses, more and more phenol appears in the distillate until finally a practically pure phenol azeotrope consisting essentially of about ninety percent water and ten percent phenol, boiling at 99.8 degrees centigrade comes over. By this time an organic phase condensate of approximately one part of otho-dichlorobenzene mixed with about three parts of phenol has been drawn off at 11. The phenol in the still 1 is now essentially free of ortho-dichlorobenzene.

The drying of the purified phenol in still 1 can be carried out by any conventional means. The preferred method is to continue the distillation with valve 7 closed and valve 15 opened, until all the water has been collected by passing the condensate through lines 5 and 16 and valve 15 to tank 17. This material can then be returned to column 3 and still 1 in subsequent operations by opening valve 18 and passing it through lines 19 and 14.

If desired, the phenol itself can be distilled further in the same equipment. It is removed from still 1 by opening valve 23 and withdrawing the phenol through line 24.

We have found that the principle of the above batch separation can be applied to purifying the phenol in a continuous operation by feeding it continuously into the middle or top portion of a distillation column, acting as the transfer zone, equipped at the bottom with a reboiler and at the top with a condenser and a liquid-liquid phase separator, and operating under conditions such that there is a substantial quantity of water in the phenol-water mixture boiling in the said reboiler. The condensed aqueous phase is returned as reflux to the top of the column with or without part of the condensed organic phase, containing the impurities being taken off for disposal. The phenol, free from impurities, but containing water is taken off continuously near the bottom of the transfer zone in the column.

A second distillation column may be used to remove the water from the purified phenol. However, it was found that by adding another (drying) section to the column below the transfer zone above-described, the operation can be carried out in the same system by adding to it another evaporator (a second reboiler) below this added drying section. In such a system, phenol is again fed into the middle or top of the transfer zone, the vapors of phenol and water enter at the bottom of the transfer zone, and anhydrous phenol leaves the bottom of the drying section.

Figure 2:
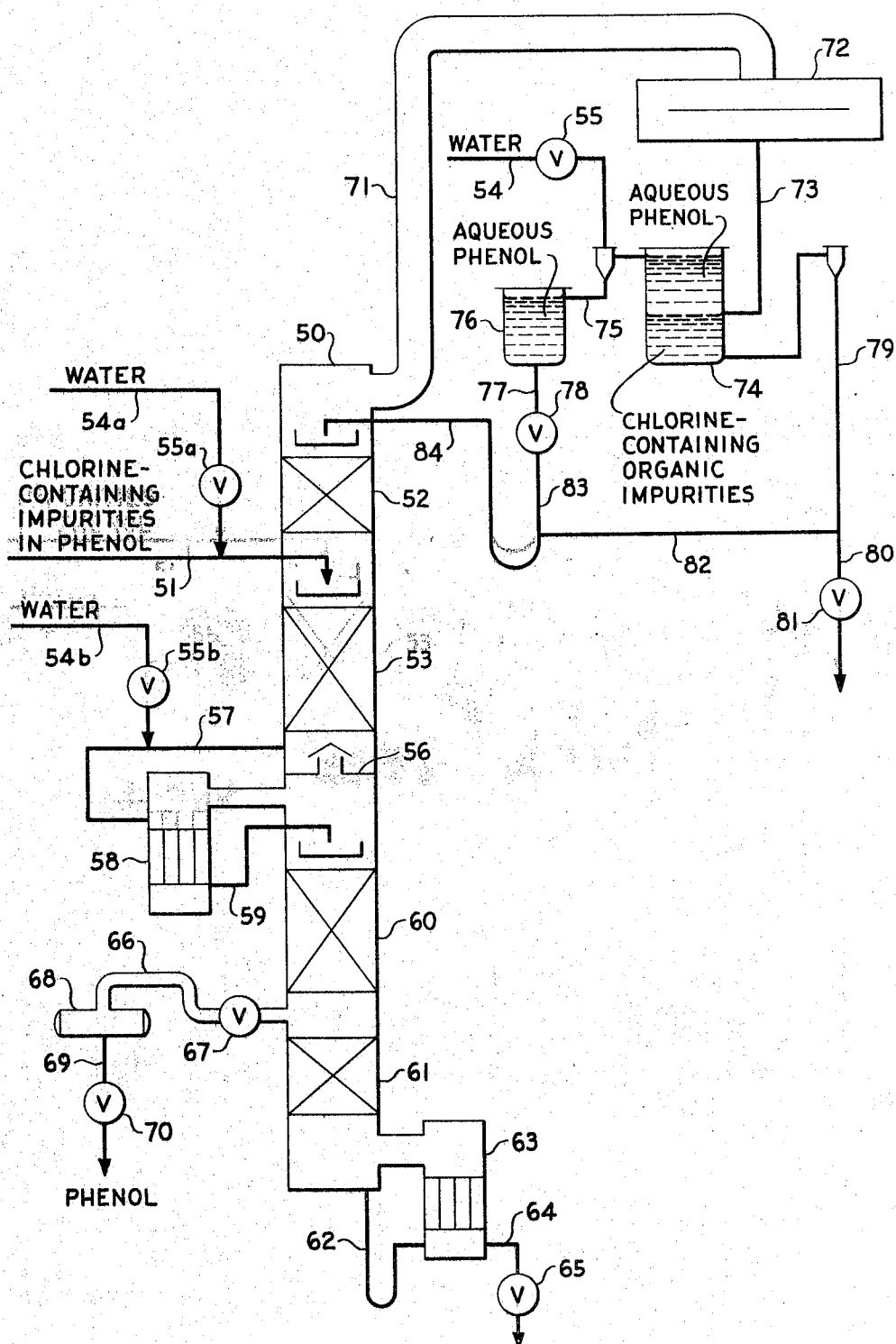

A further modification of this process, leading to its more preferred form, achieves one more step in the purification of the phenol in the same system. The phenol leaving the bottom of a system with a transfer zone and drying section as described above is free of the chlorine-containing impurities and free of water, but it contains very small quantities of high boiling decomposition products, such as tars, etc., formed in the process of vaporizing the phenol, and it contains traces of the metals and other materials of construction of the vessel with which it has been in contact. It was found that by adding another section to the column, between the drying section and the second evaporator, as depicted in FIGURE 2, this difficulty can also be overcome. In this case, the feed enters between the top and the next lower section which together form the transfer zone. However, the feed may enter at the top of a one-section zone. Phenol and water vapors enter between the transfer zone and drying section below it; pure phenol vapors are drawn off below the drying section; and the high boiling impurities of the phenol, formed or picked up during this process, leave at the bottom of the column. The operation of this column is described in Example 2 with reference being made to FIGURE 2,

*Example 2—Continuous process*

The feed consisting essentially of one hundred parts by weight per unit of time of commercial phenol made by the hydrolysis of chlorobenzene, having a freezing point of 40.65 degrees centigrade and estimated at 0.30 mole percent of impurities, containing o-chlorophenol, dichlorobenzene, trichlorobenzene, tetrachlorobenzene, and other chlorine-containing impurities boiling close to phenol, enters distillation column 50 through line 51 between sections 52 and 53, acting together as transfer zones. In passing down section 53, the liquid material is brought in contact with water vapor passing up the column 50, which vaporizes the impurities. While nearly all the water remains in the system, make-up water can be added at any suitable point in the system, such as through line 54 and valve 55, or through line 54a and valve 55a, or through line 54b and valve 55b.

The liquid descending in section 53 is collected on tray 56 and fed through line 57 into reboiler 58 which contains a solution of water and phenol boiling at about one hundred and ten degrees centigrade, and containing about ten percent water.

The overflow of this evaporator 58 passes through line 59 into section 60 of column 50, where its water content is evaporated by means of phenol vapors passing upward in the column 50. The liquid passes down through section 61, through line 62, into the reboiler 63, where essentially all phenol is vaporized. A small portion containing some higher boiling impurities is removed through line 64 and valve 65.

In the space between sections 60 and 61 of column 50, the phenol is present in the highest degree of purity, since the organic impurities volatile with water have been removed in section 53, the water has been removed in section 60, and some higher boiling, tarry impurities are kept down by section 61. The desired product is, therefore, taken off at this point, either in liquid form or, preferably, in order to avoid certain inorganic impurities which it may have picked up from the column walls, the ring packing, etc., in vapor form through line 66. The quantity is controlled by damper valve 67. The phenol vapors are condensed in condenser 68, preferably built of nickel or similar metals which do not tend to contaminate the phenol. The ultra-pure phenol leaves the system through line 69 and valve 70.

The vapor, consisting of water, phenol and the impurities, leaves column 50 through line 71 to condenser 72, where they are condensed to form an aqueous phase and an organic phase. The phases are withdrawn through line 73 and separated in gravity separator 74. The upper aqueous phase flows through line 75 into receiver 76, provided with an outlet 77 and an outlet valve 78, by the setting of which the rate of recycle of the water through lines 83 and 84 to column 50 is controlled. The lower organic layer in separator 74 is withdrawn through line 79 where it is split by conventional means into distillate taken off through line 80 and valve 81 and reflux returning through lines 82 and 84, to the top of the column 50, where together with the aqueous phase from line 83, in passing down the top section 52, it serves to concentrate the impurities.

The flow of pure phenol from line 69 amounts to approximately ninety-seven percent by weight per unit of time, having a freezing point of about 40.85 degrees centigrade, while approximately two percent by weight per unit of time of a liquid mixture of phenol and impurities, together with water, leave through line 80 and valve 81, and about one percent by weight per unit of time leaves through line 64 and valve 65. The phenol content of these two lesser streams can be recovered by conventional means.

Various modifications to the above description can be made by one of ordinary skill in this art, and such modifications are also encompassed within the scope of this invention.

We claim:

1. A process for removing chlorine-containing impurities from phenol produced by the hydrolysis of chlorobenzene, said chlorine-containing organic impurities boiling close to phenol and resulting from said production of phenol and being present in said phenol in an amount up to about one mole percent, which comprises:
    (1) admixing said phenol containing the organic impurities with water and distilling the mixture in a transfer zone to obtain a vapor at one end of the transfer zone containing water, the chlorine-containing organic impurities and a minor proportion of phenol, and a liquid at the other end of the transfer zone containing liquid aqueous phenol,
    (2) withdrawing and condensing the said vapor to form a two-phase distillate of an upper aqueous phase containing phenol and a lower organic phase of the said chlorine-containing organic impurities in phenol,
    (3) returning the said aqueous phase to the said transfer zone wherein it contacts countercurrently the said vapor,
    (4) withdrawing at least a portion of said organic phase as separated impurities, and
    (5) recovering a substantially pure phenol product from the said liquid aqueous phenol from which impurities and some phenol have been removed.

2. The process of claim 1 wherein an impurity is o-chlorophenol.
3. The process of claim 1 wherein an impurity is trichlorobenzene.
4. The process of claim 1 wherein an impurity is tetrachlorobenzene.
5. A process according to claim 1 wherein the phenol starting material is purified to a phenol having a chlorine content of less than about 75 parts per million.
6. A batch process for removing chlorine-containing organic impurities from phenol produced by the hydrolysis of chlorobenzene, said chlorine-containing organic impurities boiling close to phenol and resulting from said production of phenol, and being present in said phenol in an amount up to about one mole percent, which comprises:
    (1) admixing said phenol containing the organic impurities with water and distilling the mixture in a transfer zone to obtain a vapor at one end of the transfer zone containing water, the chlorine-containing organic impurities and a minor proportion of phenol, and a liquid at the other end of the transfer zone containing liquid aqueous phenol,
    (2) withdrawing and condensing the said vapor to form a two-phase distillate of an upper aqueous phase containing phenol and a lower organic phase of said chlorine-containing organic impurities in phenol,
    (3) returning the said aqueous phase to the said transfer zone wherein it contacts countercurrently the said vapor,
    (4) withdrawing at least a portion of said organic phase as separated impurities, and
    (5) recovering a substantially pure phenol product from said liquid aqueous phenol from which impurities and some phenol have been removed.
7. The process according to claim 6 wherein the mixture of phenol and water from which impurities and some phenol had been vaporized, is evaporated to remove substantially all the water therefrom, yielding a phenol of higher purity than the starting material.
8. A process according to claim 7 in which the phenol starting material is purified to a phenol having a chlorine content of less than about 75 parts per million.
9. A continuous process for removing chlorine-containing organic impurities from phenol produced by the hydrolysis of chlorobenzene, said chlorine-containing organic impurities boiling close to phenol and resulting from said production of phenol, and being present in said phenol in an amount up to about one mole percent, which comprises:
    (1) contacting the said phenol containing the organic impurities with water vapor in a transfer zone having two sections, by introducing the said phenol between the two sections and distilling the mixture to obtain in the upper of the said sections a vapor containing water, the chlorine-containing organic impurities and a minor proportion of phenol, and a liquid aqueous phenol in the lower of the said two sections,
    (2) withdrawing and condensing the said vapor from the said upper section to form a two-phase distillate of an upper aqueous phase containing phenol and a lower organic phase of the said chlorine-containing organic impurities in phenol,
    (3) returning the said aqueous phase to the said upper section in the transfer zone where it contacts countercurrently the said vapor,
    (4) withdrawing at least a portion of said organic phase as separated impurities,
    (5) withdrawing and vaporizing at least a portion of the said liquid aqueous phenol coming from the lower of the two said sections and returning the vapor to the said lower section, and
    (6) recovering a substantially pure phenol product from the nonvaporized liquid withdrawn from the said lower section of the said transfer zone.

10. A process according to claim 9 in which the phenol starting material is purified to a phenol having a chlorine content of less than about 75 parts per million.

References Cited by the Examiner

UNITED STATES PATENTS

| 2,051,782 | 8/1936 | Buchheim | 203—85 X |
| 2,437,649 | 3/1948 | Milner | 203—96 X |
| 2,573,244 | 10/1951 | Bogart | 203—53 X |
| 2,762,760 | 9/1956 | Walker | 203—96 |
| 2,988,573 | 6/1961 | Siehentritt | 260—62 X |

FOREIGN PATENTS

| 315,012 | 10/1919 | Germany. |
| 611,464 | 3/1935 | Germany. |

NORMAN YUDKOFF, *Primary Examiner.*

J. B. DONIHEE, *Assistant Examiner.*